United States Patent [19]

Fremont et al.

[11] 3,969,460

[45] July 13, 1976

[54] FIBER MAT CURING

[75] Inventors: Henry A. Fremont, Wyoming; Walter Phalti Lawrence, Hamilton, both of Ohio

[73] Assignee: Champion International Corporation, Stamford, Conn.

[22] Filed: July 18, 1973

[21] Appl. No.: 380,353

[52] U.S. Cl. ................................ 264/109; 260/17.2; 260/17.3; 264/128

[51] Int. Cl.[2] .......................... B29J 5/02; B29J 5/08

[58] Field of Search ............ 264/109, 128; 106/163; 260/17.2, 17.3

[56] References Cited

UNITED STATES PATENTS 3,267,188 8/1966 Bassett et al. .................. 264/109 X 3,493,527 2/1970 Schueler ........................ 264/109 X

*Primary Examiner*—Allan Lieberman

*Attorney, Agent, or Firm*—Pennie & Edmonds

[57] ABSTRACT

This invention relates to an improvement in consolidating and curing a binder-impregnated fibrous mat to form a consolidated fibersheet or fiberboard comprising hot pressing the mat at a temperature and for a time sufficient to initiate but not to complete cure of the binder, followed by immediately subjecting the mat to post curing at a temperature up to about 350°F. for a time sufficient to complete binder cure and mat consolidation.

6 Claims, No Drawings

FIBER MAT CURING

BACKGROUND OF THE INVENTION

Present practice in making consolidated fiber products, such as fibersheets and fiberboards, from resin-impregnated fibrous mats utilizes a hot pressing step in which the fibrous mat is subjected to pressure and a temperature in excess of that required to cure the resin for a time sufficient to cure the resin and consolidate the mat into the final fiber product of the desired thickness.

Such hot pressing is most usually carried out in intermittent-type platen presses. These are expensive to construct and operate, have long operating cycles due to the time required to open and close the platens, and lack versatility in processing fiber products of different weights and thicknesses.

Continuous hot press units are also used, but in order to effect cure of the resin in the mat these presses must be long and consequently are costly. In addition, the speed of mats through these presses is slow in order to insure a complete cure.

In short, present hot pressing procedures require expensive apparatus, lack versatility in processing, have slow processing speeds, and are not entirely suitable in making thin fiberboards or sheets.

SUMMARY OF THE INVENTION

A two-part operation for consolidating and curing fiber mats has been found which minimizes the capital cost of the necessary equipment, is readily adaptable in making fiber products of different weights, is easily carried out at different speeds, and can make fiberboards and sheets at faster press speeds.

The instant invention is directed to the method of consolidating and curing binder-impregnated mats of fiber to form a consolidated fiberboard product comprising hot pressing the mat at a temperature and for a time sufficient to initiate but not to complete cure of the binder, followed by immediately subjecting the mat to a temperature up to about 350°F. for a time sufficient to complete binder cure and mat consolidation. In its preferred embodiment, the two-stage consolidation and curing is carried out on continuously moving fiber mats in making fiberboards and sheets ranging in size from about 0.009 to 0.16 inches in thickness.

DETAILED DESCRIPTION

The instant invention is especially useful in making fiber boards and fibersheets from wood fibers and will be described in connection therewith. As used herein, the term "fiberboard product" is intended to mean fiberboards, fibersheets, and the like. It will be evident that in place of the wood fibers it is possible to utilize other organic as well as inorganic fibers, such as wool, cotton, fiber glass, rayon, nylon, and the like.

Save for the two-stage binder cure and mat consolidation as hereinafter described, the fibers, binders, steps of mat formation, and other processing steps are those conventionally used in making fiber boards and sheets, from wood fibers although preferably conditioning and prepressing as described in our copending applications filed of even date are most suitably used. As such, those skilled in this art know precisely what fibers, binders, equipment, and processing steps and conditions to use (other than the inventive two-step treatment of the present invention) and extended discussion thereof herein is not deemed necessary to a full and complete understanding of the instant invention. However, the description that follows will describe many of these as a further guide.

As to wood fibers, there is no criticality, although it is preferred to use pine wood fibers derived from wood chips by the conventional process of defiberizing in a double disc mill in an atmosphere of steam at elevated pressure and temperature.

The binders used and the proportions thereof are those known and now used in making fiberboards and sheets; preferably thermosetting phenolformaldehyde resins in percentages of 5% to 10% by weight. Other thermosetting resins now used in making such fiberboards and sheets are also suitable such as urea formaldehyde, melamine-formaldehyde, resorcinol modified resins, and the like.

In processing, the wood fibers are air-felted to form a mat having the desired weight per square foot and impregnated with resin. The air-felting and resin impregnation are carried out with the standard procedures and equipment now utilized for these purposes.

The resin-impregnated mat is then preferably conditioned by being adjusted to a temperature of about 180° to 210°F. and a moisture content of 6% to 12% by weight, and precompressed by any of the usual techniques presently commercially practiced. By way of example, prepressures of about 200 to 1000 psi at roll nip are used with the press time dependent in part on the moisture content of the mat and varying inversely with the pressure used; i.e., the higher the pressure, the shorter the time. Thus, precompression of 5 to 30 seconds can be used at a temperature of 400°F. and mat moisture content of about 6%.

After precompression, the mat is subjected to the two-stage consolidation and curing to cure the resin and consolidate the mat into the final product.

The first stage is hot pressing at a temperature and for a time sufficient to initiate but not to complete cure of the resin. Pressures up to about 500 psi and temperatures from about 400°F. to 550°F. are preferred, with the press time varying from about 2 to about 10 seconds, dependent upon the particular resin used, temperature used and thickness of the mat.

In the second stage, or post curing step, the cure of the resin is completed by subjecting the mat to a temperature and for a time sufficient to complete cure of the resin thus consolidating the mat. There is no need for pressure at this stage although nominal pressures can be used. The temperature used is preferably from about 200°F to 350°F. and the post cure time varies from about 30 seconds to about 5 minutes, dependent upon the particular resin, thickness of the mat, and degree of resin cure attained in the initial hot pressing step.

The operable and optimum conditions for each stage are readily determined for each particular product, i.e., particular combination of resin, wood fiber, and thickness, by first making test panels before commercial runs are made.

It is preferred to continuously hot press and post cure. For such continuous processing it is possible to use present continuous hot presses, such as the commercially available Lam-N-Hard Press, for the hot pressing stage and a tunnel, or equivalent for post curing.

With the continuous hot press, the throughput speed of the mats can be greatly increased over that presently used since there is no need in the instant process to obtain complete resin cure at this stage in order to have products with the necessary tensile strength. In addition, because complete cure is not required, the continuous hot press used in the first stage may be of a shorter length than that required for processes based on one-step complete cures.

The tunnel that can be used for post cure is provided with temperature control means to regulate the temperature in the tunnel to that desired. The mat is introduced into the tunnel from the press and conveyed through the tunnel on rollers or a continuous belt.

The combination of a smaller continuous hot press and post cure unit requires a much lower initial capital cost than that required for a corresponding degree of curing obtained in a hot pressure unit alone, which hot press must be larger and, because of the pressure required, of rugged, expensive construction in its entirety.

The invention will be further described in connection with the following examples which are set forth for purposes of illustration and in which parts are by weight unless specifically stated to the contrary.

EXAMPLES

A series of mats made by air-felting pine wood fibers were impregnated with varying percentages of phenol-formaldehyde thermosetting resins. They were then divided into four equal groups and each group consolidated to 0.04 inch fiber sheets using a different curing and consolidation method except that the hot press temperature in every case was 550°F.

Dry tensile tests were performed on each sheet of each group and the tensile strength in psi listed in Table I below for each curing and consolidation method represent the average of measurements on 5 individual strips, 1 inch by 3¼ inches, cut from the sheets of each group. The conditions of curing and test results are set forth in Table I.

TABLE I

| % Resin | Curing and Hot Press Only 3 Sec. | Curing and Hot Press Only 6 Sec. | Consolidation Method 3 Sec. Hot Press & 5 Min. Post Cure at 300°F. | Consolidation Method 3 Sec. Hot Press & 5 Min. Post Cure at 400°F. |
|---|---|---|---|---|
| 5 | 3900 | 5170 | 5890 | 5550 |
| 10 | 5430 | 6240 | 6670 | 5760 |

TABLE I-continued

Post heating at 400°F. not only gave less favorable results than at 300°F. but also caused considerable darkening of the sheets.

It will be understood that it is intended to cover all changes and modifications of the examples of the invention herein chosen for the purpose of illustration which do not constitute departures from the spirit and scope of the invention.

What is claimed is:

1. The method of consolidating and curing a thermosetting binder-impregnated fibrous mat to form a consolidated fiberboard product comprising hot pressing the mat at a temperature of about 400°F. to 550°F. and for about 2 to 10 seconds and sufficient to initiate but not to complete cure of the binder, followed by immediately subjecting the mat to a temperature up to about 350°F. for a time, up to about 5 minutes, sufficient to complete binder cure and mat consolidation.

2. The method of claim 1 wherein the post curing is carried out at atmospheric pressure.

3. The method of claim 2 wherein the hot pressing and post curing of the fibrous mat are carried out on a continuous basis.

4. The method of consolidating and curing a fibrous mat impregnated with up to about 10% by weight of thermosetting phenol-formaldehyde resin to form a consolidated dimensionally stable fiberboard product having a thickness of from about 0.009 to 0.16 inches in thickness comprising hot pressing the mat at a temperature of about 400°F. to 550°F at a pressure up to about 500 psi for a period of from about 2 to 10 seconds but insufficient to cure the resin and then immediately post curing the mat at a temperature up to about 350°F. and for a time up to about 5 minutes sufficient to complete resin cure and mat consolidation.

5. The process of claim 4 wherein the mat is hot pressed and post cured on a continuous basis.

6. The process of claim 5 wherein the hot pressing is carried out for a period of about three seconds and post curing is for a period of about five minutes.

* * * * *